Nov. 16, 1926.                                                1,607,186
                      C. B. CREAMER
                      TRACTOR GUIDE
               Filed Sept. 19, 1925        4 Sheets-Sheet 1

Inventor
C. B. Creamer.
By Lacy & Lacy, Attorneys

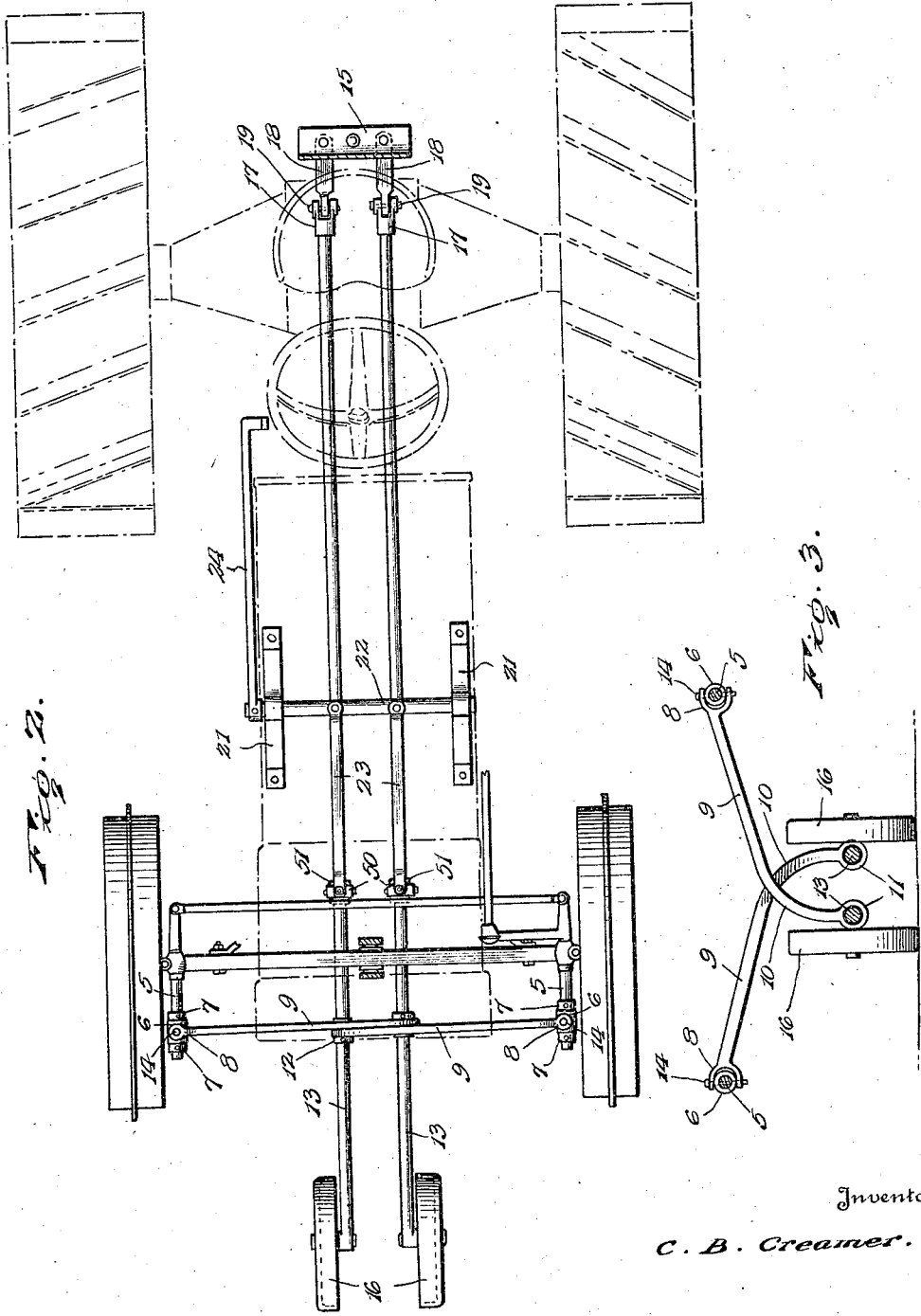

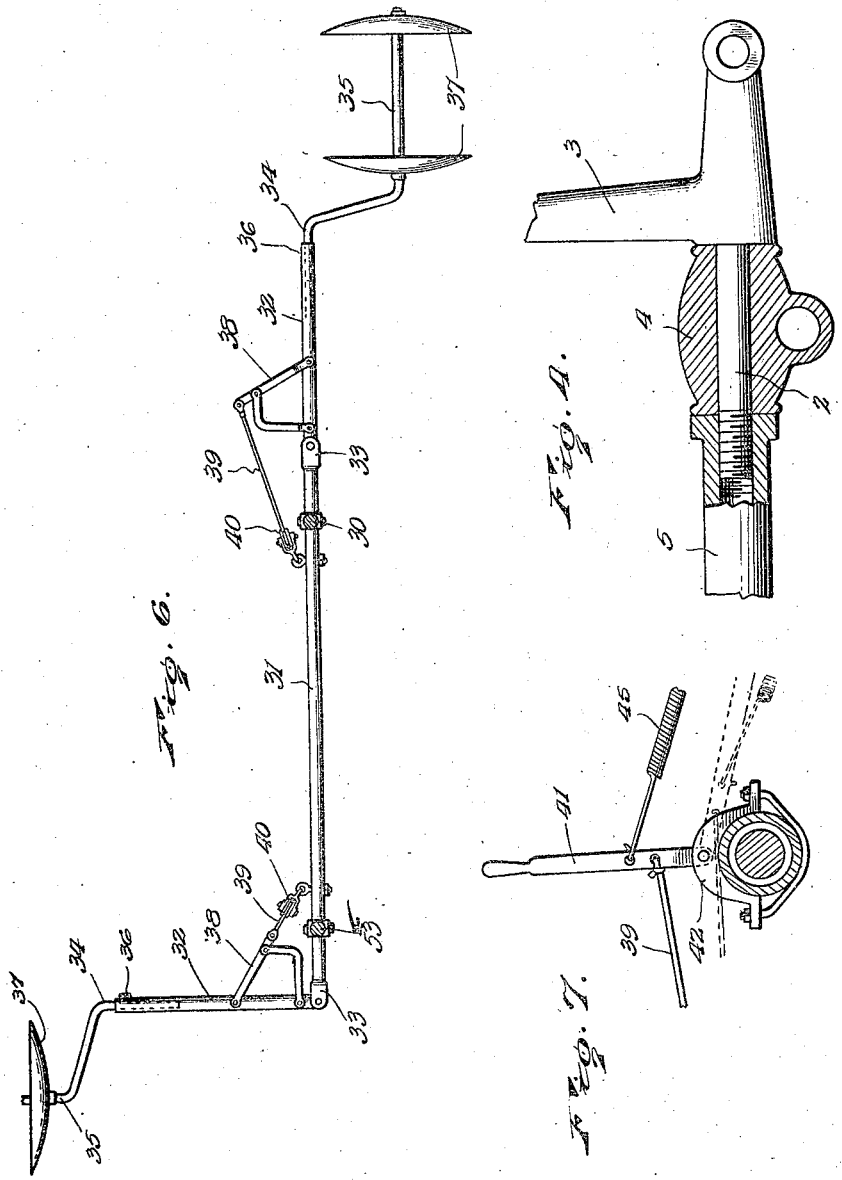

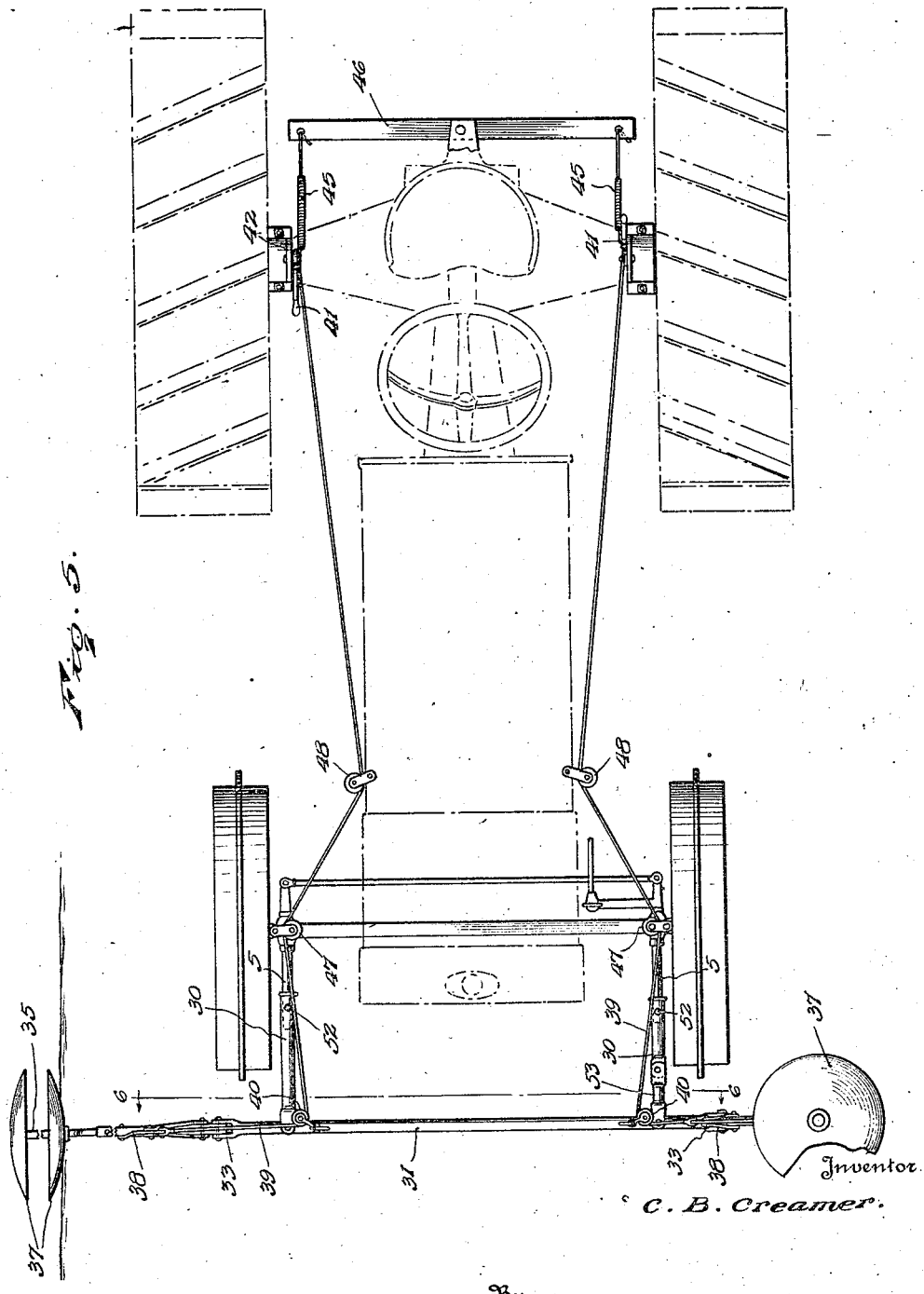

Patented Nov. 16, 1926.

1,607,186

UNITED STATES PATENT OFFICE.

CHARLES B. CREAMER, OF BIJOU HILLS, SOUTH DAKOTA.

TRACTOR GUIDE.

Application filed September 19, 1925. Serial No. 57,414.

This invention relates to means for automatically steering a tractor when the latter is used for cultivating or forming furrows prior to planting and cultivating. An object of the invention is to provide simple mechanism which may be easily mounted upon a tractor and which will run in a previously formed furrow whereby to cause the tractor to travel in a path parallel with or directly over the furrow. Another object of the invention is to provide novel means for connecting such steering devices with the usual steering mechanism of the tractor, and a still further object of the invention is to provide simple means for shifting the mechanism from operative to inoperative position or vice versa. These stated objects, and other objects which will hereinafter incidentally appear, are attained in such mechanism as is illustrated in the accompanying drawings, and the invention resides in certain novel features which will be particularly pointed out in the appended claims.

In the drawings:

Fig. 2 is a plan view of the same;

Fig. 3 is a detail transverse section on the line 3—3 of Fig. 1;

Fig. 4 is an enlarged detail horizontal section through the mounting for the steering arm of the tractor;

Fig. 5 is a plan view showing another embodiment of the invention;

Fig. 6 is a transverse section on the line 6—6 of Fig. 5, and

Fig. 7 is an enlarged detailed sectional elevation of the controlling lever shown in Fig. 5.

Figure 1:
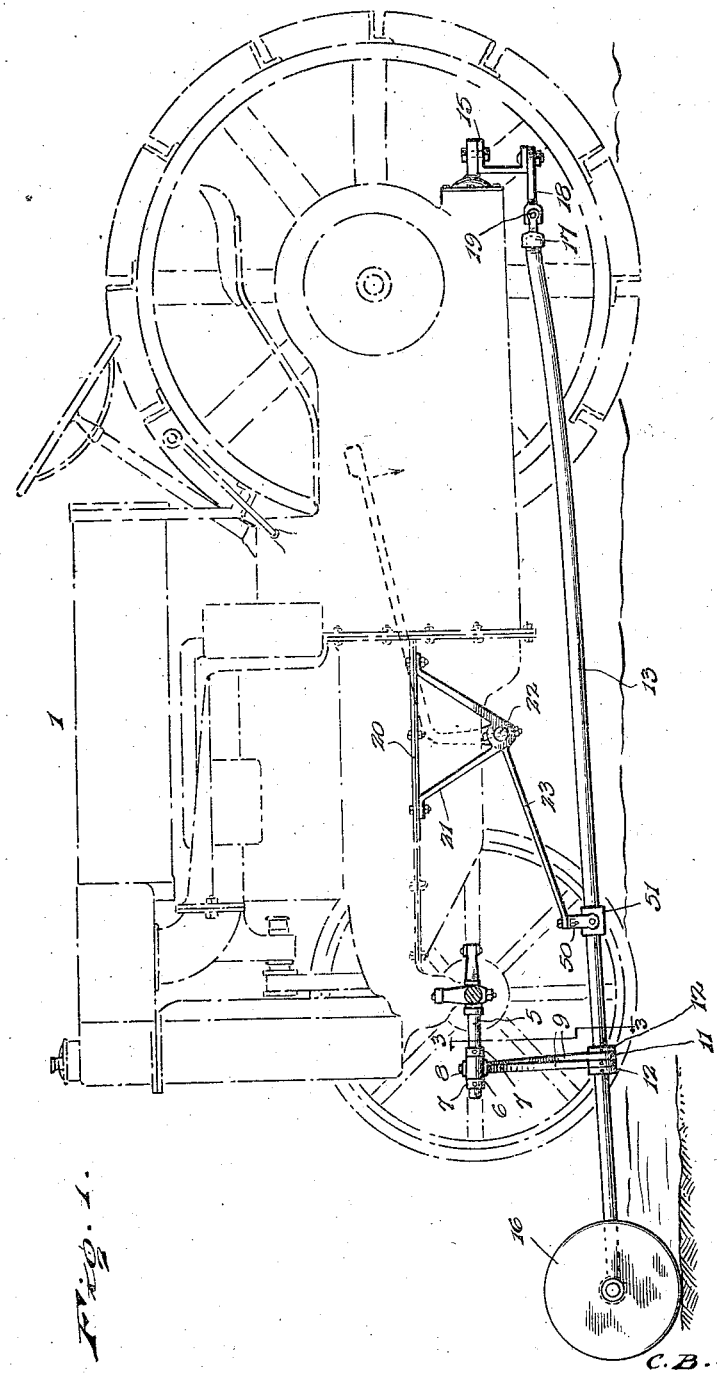
Figure 1 is a side elevation, partly in section, of one embodiment of my invention.

The tractor, indicated at 1, may be of any approved form and, for convenience, is here illustrated as one of a well-known type. In carrying out my invention, I remove from the extremity of the forwardly extending stem 2 of the steering arm 3 the nut whereby said stem is usually secured in the hub 4 of the spindle arm and substitute therefor an elongated tubular sleeve nut 5 which projects forwardly and is disposed adjacent and parallel with the front steering wheels of the tractor. Upon each of said sleeve nuts 5 is fitted a collar 6 and at the opposite ends of said collar stop collars 7 are secured upon the sleeve nut, the collar 6 being thus free to rotate or rock upon the nut but being prevented from moving endwise thereon. Each collar 6 is spanned by a fork 8 formed on the outer end of a cross bar 9 which extends inwardly and has its inner end turned downwardly, as indicated at 10, and formed into an eye 11 encircling a steering bar 13 between stop collars 12. It will be understood, of course, that the fork 8 is pivoted to the collar 6, as indicated, by the pin 14. The steering bars 13 are disposed in parallelism at opposite sides of the medial longitudinal plane of the tractor and extend below the tractor to have their rear ends connected with the drawbar 15 of the tractor, and it will be noted that the cross bars 9 extend inwardly past each other so that each bar connects a steering bar 13 with the nut 5 at the opposite side of the tractor. Each bar 13 carries at its front end a disk or bell wheel 16 which is adapted to run in the furrow and bear against one side wall of the same so that the wheels will be caused to follow the furrow and maintain the tractor disposed centrally over the same. The rear end of each steering bar 13 is equipped with a yoke or fork 17 which is pivoted to the front end of a coupling link 18, as shown at 19, the link being in turn pivotally attached to the drawbar 15, and it is to be noted that the pivotal mounting of the link 18 will permit it to swing in a horizontal plane while preventing swinging movement in a vertical plane and the pivot 19 will permit the steering bar 13 to swing vertically relative to the link but will prevent relative horizontal swinging so that, while the steering wheels 16 may have both vertical and horizontal movements and thereby follow strictly the line of the furrow, rolling of the steering bars or rocking movement thereof about their longitudinal axes will be prevented, the steering wheels being, consequently, held positively to the work.

In the form of tractor illustrated, the crank shaft casing is provided on both sides with longitudinally extending flanges, indicated at 20. In carrying out my invention, I secure to said flanges depending brackets 21, in the lower ends of which is mounted a rock shaft 22 and to the said rock shaft are secured the rear ends of lifter arms 23 which extend forwardly and downwardly therefrom to be pivotally attached to the respective steering rods 13. Upon one end of the rock shaft 22 is secured a foot lever 24 which extends rearwardly to a point where it may be easily reached by the operator of the machine. The front extremities of the lifting arms are flattened and pivoted upon yokes 50 which rise from and are pivoted to sleeves 51 fitted upon the steering bars.

The form of the invention thus far described is intended more particularly for use in cultivating listed corn wherein it is desired to have the tractor ride upon the ridges between the rows of the corn and the cultivator shovels drawn by the tractor work in the furrow. Obviously, the steering wheels 16 will be held to the sides and bottom of the furrow and any irregularity in the furrow will cause the wheels to shift as they travel past the same, and the shifting of the wheels will be transmitted directly through the cross bars 9 to the sleeve nuts 5 and the steering knuckles to which the said nuts are attached. The steering mechanism of the tractor will thus be automatically actuated to cause the tractor to follow the line of the furrow and the cultivators drawn by the tractor will be likewise shifted. When the tractor is to be moved from one field to another or is making a turn at the end of a row, the foot lever 24 is depressed so that the steering attachment will be raised and the wheels 16 thereby lifted from the furrow and be held in the raised position until the tractor is in position to proceed along another furrow, whereupon the mechanism will be again lowered. The sleeves 6 and eyes 11 will accommodate the relative vertical rocking of the cross bars 9 when the steering bars 13 are raised and the pivotal mounting of the rear ends of the steering bars will accommodate the relative angular movement.

The form of the invention which has been described may be used for cultivating three rows or furrows simultaneously by connecting a three-row cultivator to the tractor, although it may be used to cultivate one row at a time as is obvious. The invention is also applicable to the forming of furrows where it is desired to insure a second furrow being parallel throughout with a previously formed furrow, and for this particular purpose the embodiment illustrated in Figs. 5, 6 and 7 is particularly designed. In the form of the invention about to be described, I employ sleeves or tubular arms 30 which are secured at their rear ends upon the front ends of the sleeve nuts 5 by set bolts 52, these arms 30 extending forwardly beyond the steering wheels of the tractor, as clearly shown in Fig. 5. The arms 30 are pivotally connected at their front ends to a transverse connecting bar 31 which extends across the front of the tractor in advance of the tractor steering wheels and has a supplemental arm 32 pivoted to each of its ends, the ends of the connecting bar 31 being forked, as shown at 33, to receive the inner end of the respective supplemental arm or bar 32. As shown in Fig. 5, one arm 30 is pivoted directly to the cross bar 31 while the other arm is connected thereto by a coupling link 53, this arrangement being employed with some forms of tractors in which the tie rod of the steering gear is shorter than the axle and the distance between the arms 30, consequently, tends to vary as they swing laterally. The outer end of each bar 32 is preferably hollow or of a socketed formation whereby it may receive the inner end 34 of a spindle 35 which is adjustably secured in the socket by a set screw 36. The spindle 35 is offset relative to the arm 32 and steering wheels or disks 37 are carried by the said spindle 35 to run in a furrow at the side of the tractor and bear against the walls of the same in exactly the same manner as the steering wheels 16 ride in a furrow over which the tractor travels. A bracket 38 is secured to and rises from the secondary arm 32 between the ends thereof, and a cable or other flexible connection 39 is attached to the upper end of said arm. The said cable passes around a guide pulley 40, carried by the connecting bar 31 adjacent the end thereof, and thence passes along the side of the tractor to the rear end thereof where it is attached to a hand controlling lever 41. This hand lever 41 may conveniently be fulcrumed upon a bracket 42 secured upon the rear axle housing. A spring 45 is attached to the lever and to some fixed element upon the tractor, such as a cross bar 46. As shown in Fig. 7, the spring 45 is attached to the lever at a point above the point of attachment of the cable to the lever so that when the lever is vertical, as shown in full lines, the contractile force of the spring will be acting to assist in raising the steering devices. When the lever is swung forward and the attachment is at work, the spring will be acting on a line passing across or below the end of the cable and, therefore, will be neutralized. When the lever is swung downwardly to the rear, as shown by dotted lines, and the attachment is raised, the cable will pass below the fulcrum of the lever and the spring will serve as a lock, the latch and rack usually employed in connection with such levers being unnecessary. In order to direct the cables 39 along paths which will not interfere with any of the operating parts of the tractor, I pass the intermediate portion of the cable around guide pulleys 47 and 48 mounted respectively upon the front axle of the tractor and the flange of the crank-shaft housing, as shown in Fig. 5, but it will be understood that these intermediate guide pulleys may be dispensed with and the cable carried directly from the pulley 40 to the hand lever. The arrangement of the pulleys shown and described brings the bends or turns in the cables as near as possible to the pivots of the moving parts of the steering gear, so that, in turning the tractor, the effective length of the cable will remain substantially uniform.

After one furrow has been formed and the tractor set in position to produce a second furrow, the arm 32 at that side of the tractor which is next the furrow is lowered so that the disks 37 thereon will set within the furrow after which the tractor is driven across the field to make the second furrow. It will be readily seen that the steering disks 37, riding against the walls of the previously formed furrow, will hold the tractor positively and automatically to a path which will be strictly parallel to the furrow and, consequently, the second furrow will be parallel with the first furrow throughout its extent.

In both described forms of the invention, the usual steering mechanism of the tractor is left unchanged, with the exception that the spindle arm securing nut is removed and an elongated nut or arm substituted therefor. The attachment operates automatically to guide the tractor in a path corresponding to the formed furrow and the operator need pay no attention whatever to the steering of the tractor. In the second described form of the invention, one set of steering disks will be raised and the other set lowered under normal conditions, but it will be understood that this formation of the invention may be used also in cultivating inasmuch as both sets of disks may be lowered and instead of one pair of steering wheels or disks running in a furrow below the tractor, as in the first described arrangement, there will be two sets of steering wheels or disks each running in a furrow at the side of the tractor.

Having thus described the invention, I claim:

1. A steering attachment for tractors comprising supporting members adapted to be secured to the spindle arms of the tractor and project forwardly therefrom, steering bars, means whereby said bars may be mounted at their rear ends upon the tractor for vertical and lateral movement, cross bars mounted upon the said supporting members and connected with the steering bars and having relative vertical rocking movement upon both the supporting members and the steering bars, and steering disks carried by the front ends of the steering bars to run in a furrow and ride against the side walls of the furrow.

2. A steering attachment for tractors comprising supporting members adapted to be secured to the steering arms of the tractors and project forwardly therefrom, collars fitted upon the said supporting members, cross bars pivoted to said collars and extending inwardly and downwardly therefrom to points beyond the medial longitudinal plane of the tractor, steering bars, means for supporting the steering bars at their rear ends upon the tractor, the steering bars being supported near their front ends by said cross bars, and steering disks carried by the front ends of the steering bars to run in a furrow and ride against the side walls of the same.

3. A steering attachment for tractors comprising supporting members adapted to be secured to the steering arms of the tractor and project forwardly therefrom, cross bars engaged at their outer ends upon said supporting members and having their inner ends disposed below said members and beyond the medial longitudinal plane of the tractor, steering bars having their front end portions supported by the inner ends of said cross bars and provided at their rear ends with means whereby they may be supported upon the tractor, steering disks carried by the front ends of the steering bars to run in the furrow and ride against the side walls of the same, a rock shaft above the steering bars, lifting arms secured to said rock shaft and engaged with the respective steering bars, and means for rocking said shaft whereby to lift the steering bars.

4. A steering attachment for tractors comprising supporting members adapted to be secured to the steering arms of the tractor, cross bars having their outer ends engaged with said supporting members and their inner ends disposed at opposite sides of the central longitudinal plane of the tractor, steering bars having their front end portions carried by said cross bars, steering disks carried by the front ends of the steering bars to run in a furrow and ride against the side walls of the same, the rear ends of the steering bars being equipped with forks, and links pivoted within said forks to permit relative vertical rocking movement of the same and adapted to be pivotally connected at their rear ends with the tractor for relative horizontal rocking movement.

In testimony whereof I affix my signature.

CHARLES B. CREAMER. [L. S.]